US011235802B2

(12) United States Patent
Ren et al.

(10) Patent No.: US 11,235,802 B2
(45) Date of Patent: Feb. 1, 2022

(54) ENHANCED VEHICLE OPERATION

(71) Applicant: Ford Global Technologies, LLC, Dearborn, MI (US)

(72) Inventors: Zhong Ren, Troy, MI (US); Lodewijk Wijffels, Northville, MI (US); Joshua Guerra, Farmington Hills, MI (US); Scott J. Lauffer, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 16/679,798

(22) Filed: Nov. 11, 2019

(65) Prior Publication Data

US 2021/0139075 A1  May 13, 2021

(51) Int. Cl.
| | |
|---|---|
| *B62D 6/02* | (2006.01) |
| *B62D 6/10* | (2006.01) |
| *B60W 10/20* | (2006.01) |
| *B62D 6/00* | (2006.01) |
| *G05D 1/00* | (2006.01) |

(52) U.S. Cl.
CPC .............. *B62D 6/10* (2013.01); *B60W 10/20* (2013.01); *B62D 6/007* (2013.01); *B62D 6/02* (2013.01); *G05D 1/0061* (2013.01); *G05D 1/0088* (2013.01); *G05D 2201/0213* (2013.01)

(58) Field of Classification Search
CPC ............ B62D 6/10; B62D 6/007; B62D 6/02; B60W 10/20; G05D 1/0061; G05D 1/0088; G05D 2201/0213
See application file for complete search history.

(56) References Cited

U.S. PATENT DOCUMENTS

| | | | |
|---|---|---|---|
| 7,069,129 | B2 | 6/2006 | Iwazaki et al. |
| 7,433,468 | B2 | 10/2008 | Bernzen et al. |
| 8,170,751 | B2 | 5/2012 | Lee et al. |
| 9,150,246 | B2 | 10/2015 | Lee et al. |
| 9,296,391 | B2 | 3/2016 | Lu et al. |
| 9,346,400 | B2 | 5/2016 | Attard et al. |
| 9,527,527 | B2 | 12/2016 | Lazic et al. |
| 9,845,096 | B2 | 12/2017 | Urano et al. |
| 9,873,453 | B2 | 1/2018 | Shah et al. |
| 2007/0144814 | A1 | 6/2007 | Arnold et al. |
| 2017/0066473 | A1 | 3/2017 | Yu et al. |
| 2018/0354555 | A1 | 12/2018 | Sheng et al. |

FOREIGN PATENT DOCUMENTS

| | | |
|---|---|---|
| CN | 105279309 B | 11/2018 |
| DE | 102017210966 A1 | 1/2019 |

*Primary Examiner* — Mathew Franklin Gordon
(74) *Attorney, Agent, or Firm* — Frank A. MacKenzie; Bejin Bieneman PLC

(57) ABSTRACT

A computer includes a processor and a memory, the memory storing instructions executable by the processor to detect an actual steering column torque and an actual steering wheel angle, predict a steering wheel torque with a state-estimation algorithm that outputs a plurality of vehicle states including the predicted steering wheel torque, adjust the plurality of vehicle states based on an algorithm noise that is based on a steering wheel angular speed to generate estimated vehicle states, output the estimated vehicle states including an estimated user-applied steering wheel torque, and transition from an autonomous mode to a manual mode when the estimated steering wheel torque exceeds a threshold. The state-estimation algorithm accepts input including the actual steering column torque and the actual steering wheel angle and outputs the plurality of vehicle states.

20 Claims, 4 Drawing Sheets

ENHANCED VEHICLE OPERATION

BACKGROUND

Vehicles can travel along roadways that are typically shared by other vehicles. Autonomous or semi-autonomous vehicles, i.e., vehicles that operate wholly or at least partly without intervention of a human operator, can adjust their speed and distance from other vehicles based on the position of the other vehicles. For example, a vehicle could adjust steering without input from the human operator.

DETAILED DESCRIPTION

Figure 1:
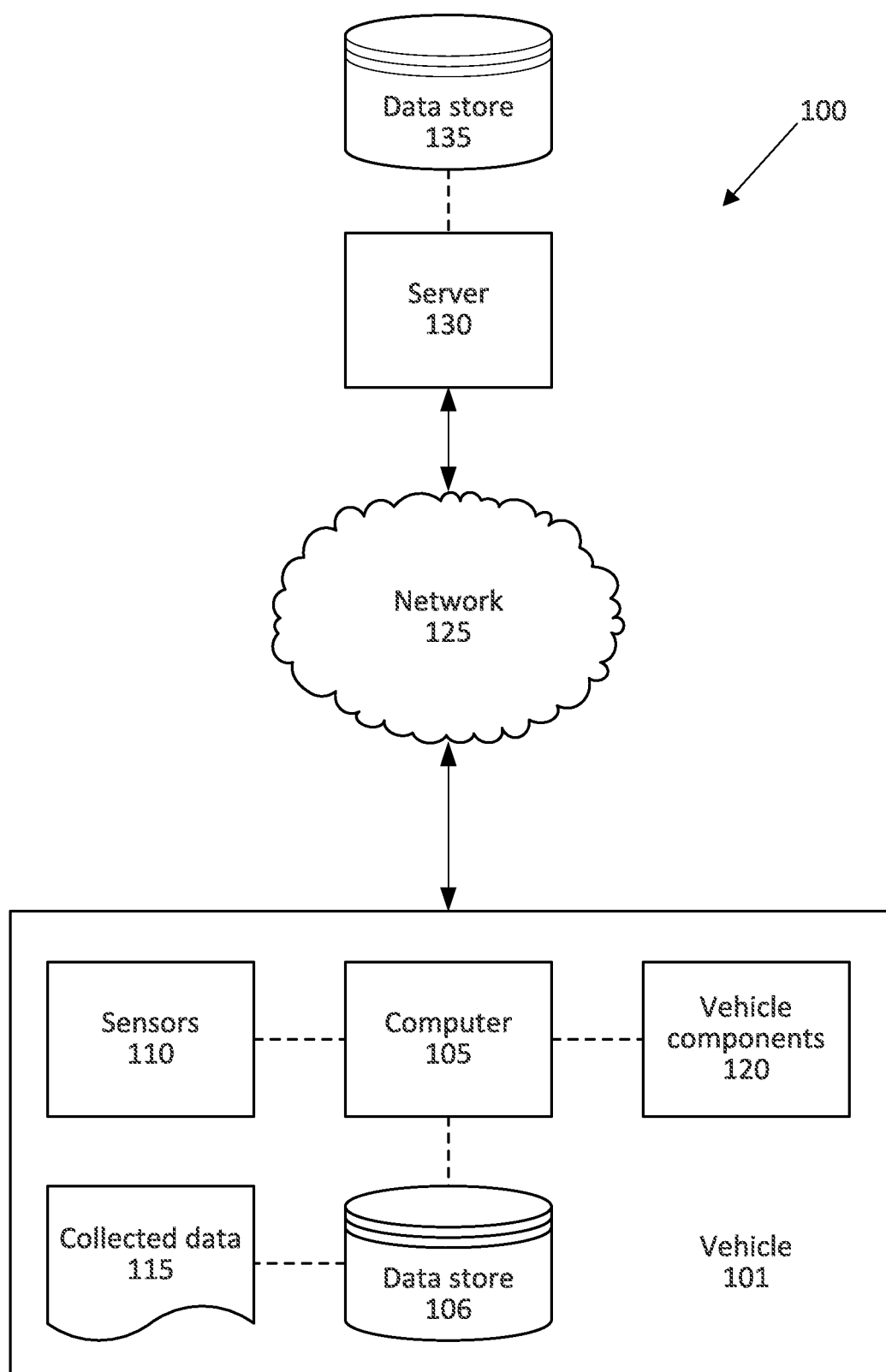
FIG. 1 is a block diagram of an example system for operating a vehicle.

A system includes a computer including a processor and a memory, the memory storing instructions executable by the processor to detect an actual steering column torque and an actual steering wheel angle, predict a user-applied steering wheel torque with a state-estimation algorithm that accepts input including the actual steering column torque and the actual steering wheel angle, and outputs a plurality of vehicle states including the predicted user-applied steering wheel torque, adjust the plurality of vehicle states based on an algorithm noise that is based on a steering wheel angular speed to generate estimated vehicle states, output the estimated vehicle states including an estimated user-applied steering wheel torque, and transition from an autonomous mode to a manual mode when the estimated user-applied steering wheel torque exceeds a threshold.

The plurality of vehicle states can include the steering wheel torque, an estimated steering wheel angle, and an estimated steering wheel angle speed.

The estimated steering wheel angle speed can include a time rate of change of the steering wheel angle and a steering wheel inertia generated by the actual steering wheel torque turning a steering wheel to the actual steering wheel angle.

The instructions can further include instructions to transition from the autonomous mode to the manual mode when the estimated user-applied steering wheel torque exceeds the threshold for an elapsed time exceeding a time threshold.

The instructions can further include instructions to input the actual steering column torque, the actual steering wheel angle, a stiffness of a steering column, and a damping coefficient of the steering wheel to the state-estimation algorithm to estimate the user-applied steering wheel torque.

The algorithm noise is can be a covariance of a modeling error, the steering wheel angular speed, and a noise factor that is inversely proportional to the steering wheel angular speed.

The instructions can further include instructions to initiate the state-estimation algorithm with a set of predetermined parameters including a reference steering motor torque and a reference steering wheel angle.

The state-estimation algorithm can be a Kalman filter.

The estimated user-applied steering wheel torque can be a torque applied to a steering wheel by an operator of a vehicle.

The instructions can further include instructions to input a damping coefficient of a steering column and a damping coefficient of a steering wheel to the state-estimation algorithm to estimate the user-applied steering wheel torque.

A method includes detecting an actual steering column torque and an actual steering wheel angle, predicting a user-applied steering wheel torque with a state-estimation algorithm that accepts input including the actual steering column torque and the actual steering wheel angle, and outputs a plurality of vehicle states including the predicted user-applied steering wheel torque, adjusting the plurality of vehicle states based on an algorithm noise that is based on a steering wheel angular speed to generate estimated vehicle states, outputting the estimated vehicle states including an estimated user-applied steering wheel torque, and transitioning from an autonomous mode to a manual mode when the estimated user-applied steering wheel torque exceeds a threshold.

The method can further include transitioning from the autonomous mode to the manual mode when the estimated user-applied steering wheel torque exceeds the threshold for an elapsed time exceeding a time threshold.

The method can further include inputting the actual steering column torque, the actual steering wheel angle, a stiffness of a steering column, and a damping coefficient of the steering wheel to the state-estimation algorithm to estimate the user-applied steering wheel torque.

The method can further include initiating the state-estimation algorithm with a set of predetermined parameters including a reference steering motor torque and a reference steering wheel angle.

The method can further include inputting a damping coefficient of a steering column and a damping coefficient of a steering wheel to the state-estimation algorithm to estimate the user-applied steering wheel torque.

A system, includes a steering wheel, a steering column connected to the steering wheel, means for detecting an actual steering column torque and an actual steering wheel angle of the steering wheel, means for predicting a user-applied steering wheel torque with a state-estimation algorithm that accepts input including the actual steering column torque and the actual steering wheel angle, and outputs a plurality of vehicle states including the predicted user-applied steering wheel torque, means for adjusting the plurality of vehicle states based on an algorithm noise that is based on a steering wheel angular speed to generate estimated vehicle states, means for outputting the estimated vehicle states including an estimated user-applied steering wheel torque; and means for transitioning from an autonomous mode to a manual mode when the estimated user-applied steering wheel torque exceeds a threshold.

The system can further include means for transitioning from the autonomous mode to the manual mode when the estimated user-applied steering wheel torque exceeds the threshold for an elapsed time exceeding a time threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Human users can provide input to a steering wheel to transition from an autonomous mode to a semiautonomous mode or a manual mode. The input can be measured as a torque applied to the steering wheel. When a steering assembly is operated autonomously, i.e., without input from the human user, a steering motor applies steering torque to a steering rack without input from the user. In some instances, it may be necessary to detect that the human user intends to manually operate the vehicle while the vehicle is in an autonomous or semiautonomous mode. The user may input manual torque to the steering rack by rotating the steering wheel when the user desires to assume manual control of the steering assembly. Differentiating the torque provided by the user from the resulting torque of the steering column inertia can be difficult. Using a Kalman filter as a state-estimation algorithm to estimate user applied torque of the steering wheel and column based on measurements of steering torque and steering wheel angles provides a substantially real-time estimation of the torque applied to the steering wheel by the user to determine whether the user intends to transition autonomous control of the steering to manual control.

FIG. 1 illustrates an example system 100 for operation of a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
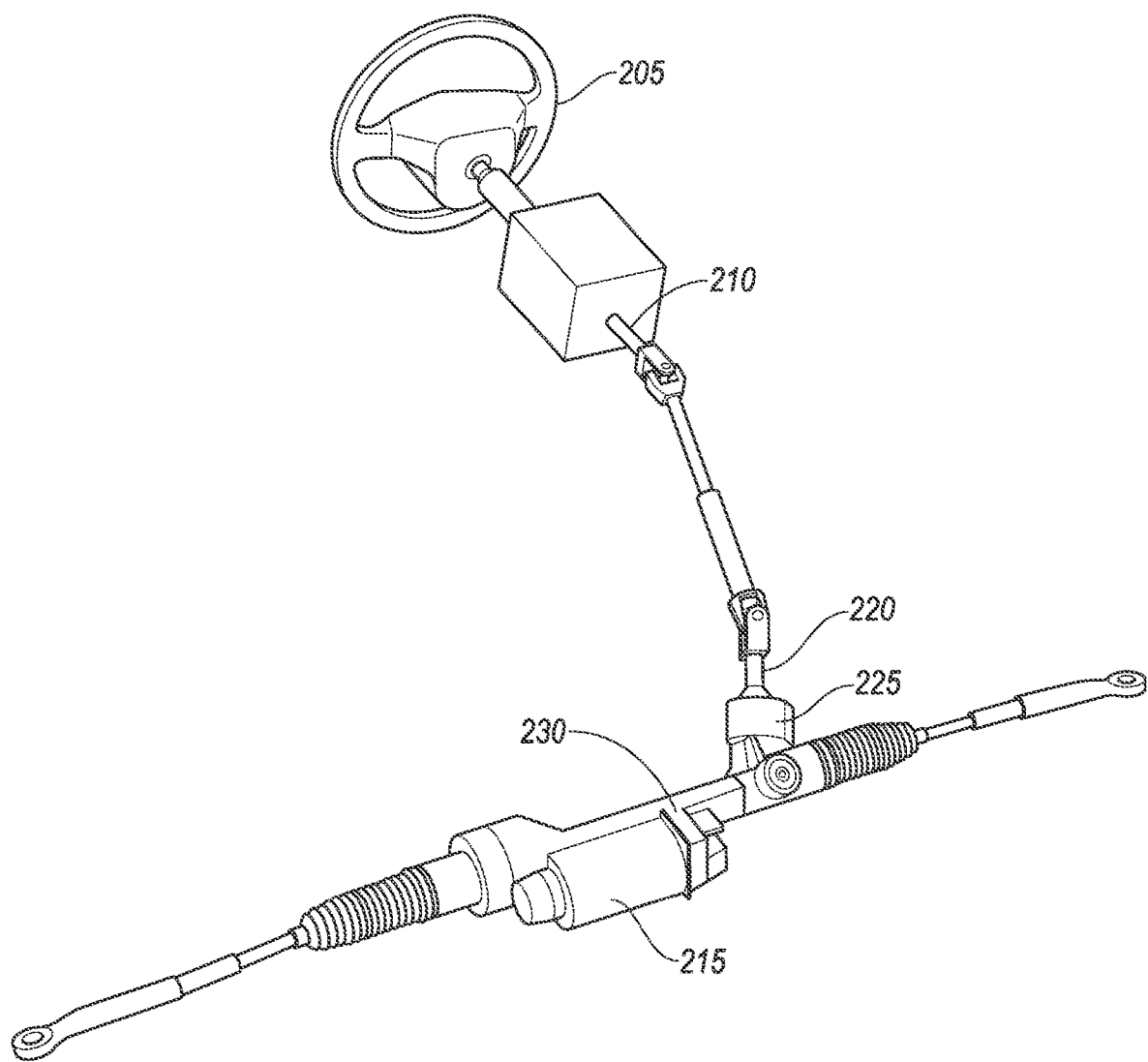
FIG. 2 is a perspective view of an example steering system.

FIG. 2 is a perspective view of an example steering assembly 200 for a vehicle 101. The steering assembly 200 includes a steering wheel 205, a steering column 210, a steering motor 215, a torsion bar 220, a pinion 225, and a steering rack 230. The computer 105 and/or a user operates the steering assembly 200 to steer the vehicle 101.

The steering assembly 200 includes the steering wheel 205. The steering wheel 205 allows the user to steer the vehicle 101 by transmitting rotation of the steering wheel 205 to movement of the steering rack 230. The steering wheel 205 may be, e.g., a rigid ring fixedly attached to the steering column 210.

The steering assembly 200 includes the steering column 210. The steering column 210 transfers rotation of the steering wheel 205 to movement of the steering rack 230. The steering column 210 may be, e.g., a shaft connecting the steering wheel 205 to the steering rack 230.

The steering assembly 200 includes the steering motor 215. The steering motor 215 can move the steering rack 230. That is, the computer 105 can actuate the steering motor 215 to move the steering rack 230 without input from the user. The computer 105 can actuate the steering motor 215 to provide additional steering torque for the user (e.g., during power steering) or to steer the vehicle 101 without input from the user. Alternatively, not shown in the Figures, the steering motor 215 can be rotatably connected to the steering column 210 to provide additional steering torque to the steering column 210.

The steering assembly 200 includes the torsion bar 220. The torsion bar 220 can be a device that connects the steering column 210 to the pinion 225. The torsion bar 220 allows rotation of the pinion 225 by the steering column 210. The torsion bar 220 can resist external forces to the pinion 225, e.g., changes in road grade, potholes, etc., to reduce rotation of the pinion 225 from forces other than the steering wheel 205. The torsion bar 220 can be, e.g., a flexible spring.

The steering assembly 200 includes the pinion 225. The pinion 225 transfers rotation of the steering column 210 to translational motion of the steering rack 230. For example, the pinion 225 can be a circular gear. The pinion 225 defines a pinion angle $\theta_p$, i.e., an angle of the pinion 225 relative to a neutral position. The pinion angle $\theta_p$ is proportional to a steering wheel angle $\theta_{sw}$, as described below. That is, changes to the steering wheel angle $\theta_{sw}$ generate predictable and proportional changes to the pinion angle $\theta_p$.

The steering assembly 200 includes the steering rack 230. The steering rack 230 can transfer rotational motion of the steering column 210 to rotation of wheels (not shown) of the vehicle 101. The steering rack 230 can be, e.g., a rigid bar or shaft having teeth engaged with the pinion 225.

Figure 3:
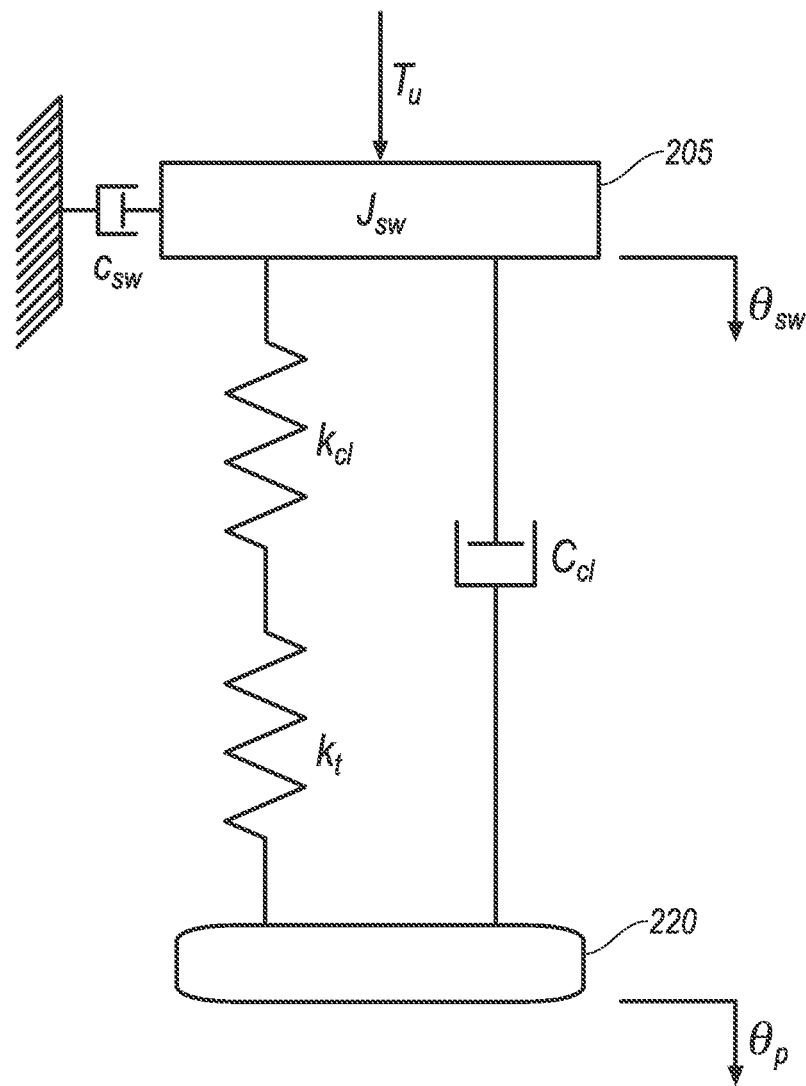
FIG. 3 is a block diagram of the example steering system.

FIG. 3 is a block diagram of the steering assembly 200 illustrating forces applied to steer the vehicle 101. The computer 105 can measure an actual steering column torque $T_m$. The steering column torque $T_m$ is an actual torque applied by the steering column 205 to the torsion bar 220. The computer 105 can determine the steering column torque $T_m$ from data 115 from a torque sensor 110 in communication with the torsion bar 220.

The computer 105 can measure a pinion angle $\theta_p$. The "pinion angle" is the angle of the pinion 225 relative to a specified or defined neutral position. The pinion angle $\theta_p$ is directly proportional to an actual steering wheel angle $\theta_{sw}$ by a steering ratio r. That is, $\theta_{sw} = r\theta_p$. The pinion 225 and the steering wheel 205 can be separated by one or more gears that translate rotation of the steering wheel 205 to rotation of the pinion 225, and the combined gear ratios of the gears between the steering wheel 205 and the pinion 225 can be the steering ratio r. The computer 105 can determine the pinion angle $\theta_p$ with an angle sensor 110 on the pinion 225.

The data store 106 and/or the server 130 can store coefficients associated with damping effects of the components 120 in the steering assembly 200. That is, each component 120 in the steering assembly 200 can reduce energy transfer from the steering wheel 205 and/or the steering motor 210 to the steering rack 230 from, e.g., friction, slippage, etc. The damping coefficients can be empirically determined from tests of one or more steering assemblies 200. The empirical tests can include operating a steering assembly 200 with according to specified steering torques and determining the damping coefficients from measured pinion angles according to a conventional dynamic model correlating steering torque to steering angle. The empirical tests can be performed for a plurality of steering assemblies 200 with differing characteristics for parts of the steering assemblies 200, e.g., different lengths of steering columns 210, different material properties, etc., to determine the damping coefficients for a steering assembly 200 installed in the vehicle 101. The coefficients can include, e.g., a damping coefficient of the steering wheel $c_{sw}$, a damping coefficient of the steering column $c_{cl}$, a stiffness coefficient of the column $k_{cl}$, and a stiffness coefficient of the torsion bar $k_t$. The stiffness coefficients $k_{cl}$, $k_t$ can be combined into an effective stiffness $$k_{eff} = \frac{k_{cl}k_t}{k_{cl} + k_t}.$$

The steering assembly 200 defines a coefficient $b_\theta$ that is a combined viscous friction coefficient of components of the steering assembly 200. The shape of the steering wheel 205 defines a moment of inertia $J_{sw}$ according to conventional moment of inertia dynamic equations, and the moment of inertia $J_{sw}$ can be stored in the data store 106 and/or the server 130.

The computer 105 can identify a plurality of states for a state-estimation algorithm to estimate a steering torque generated by a user $T_u$ of the vehicle 101, i.e., a user-applied steering wheel torque. In this context, to "estimate" the steering torque means to predict a value for the steering torque and to correct the value based on noise generated by a prediction algorithm. The state-estimation algorithm, explained further below, rapidly discretizes and calculates the estimated user-applied steering wheel torque $T_u$ in real time based on the parameters describing the steering assembly 200 above. In this context, the state-space algorithm "discretizes" theoretical kinematic models of the steering assembly 200 by collecting data 115 in predetermined timesteps according to the resolution of the sensors 110 and calculating the estimated user-applied steering torque $T_u$ for each timestep. By estimating the steering torque $T_u$, the computer 105 can compare the estimated steering wheel torque $T_u$ to a predetermined torque threshold $T_d$ to determine whether the user intends to transition the vehicle 101 from autonomous control of the steering assembly 200 to manual control, i.e., from one of the autonomous mode or the semiautonomous mode to one of the semiautonomous mode or the manual mode. The computer 105 can identify two state equations describing three states:

$$\begin{bmatrix} \dot{x}_1 \\ \dot{x}_2 \\ \dot{T}_u \end{bmatrix} = \begin{bmatrix} 0 & 1 & 0 \\ -\frac{k_{eff}}{J_{sw}} & -\frac{c_{cl} + c_{sw}}{J_{sw}} & \frac{1}{J_{sw}} \\ 0 & 0 & 0 \end{bmatrix} \begin{bmatrix} x_1 \\ x_2 \\ T_u \end{bmatrix} + \begin{bmatrix} \frac{c_{cl}}{J_{sw}} \\ \frac{k_{eff} - b_\theta}{J_{sw}} - \frac{c_{cl}(c_{cl} + c_{sw})}{J_{sw}^2} \\ 0 \end{bmatrix} \theta_p \quad (1)$$

$$T_m = \begin{bmatrix} k_{\mathit{eff}} & 0 & 0 \end{bmatrix} \begin{bmatrix} x_1 \\ x_2 \\ T_u \end{bmatrix} + (-k_{\mathit{eff}})\theta_p \quad (2)$$

where $x_1$, $x_2$ and $T_u$ are the vehicle states to be estimated by the state-estimation algorithm and $T_m$ is the actual steering column torque, as described above. As described above, $T_u$ is the estimated user-applied steering torque. The states $x_1$, $x_2$ are defined as:

$$x_1 = \theta_{sw} \quad (3)$$

$$x_2 = \dot{\theta}_{sw} - \frac{c_{cl}}{J_{sw}}\theta_p$$

The dot notation indicates a time rate of change of a variable, e.g., $\dot{x}_1$ is the time rate of change of the state $x_1$. Equations 1-3 can be discretized for timesteps [1,k] and each matrix can be represented for clarity as a single alphanumeric variable:

$$x_{k+1} = Ax_k + Bu_k + G\xi_k \quad (4)$$

$$y_k = Cx_k + Du_k + v_k \quad (5)$$

where $x_{k+1}$ is the value for the vehicle states $[x_1\ x_2\ T_u]^T$ at a predicted timestep k+1, $x_k$ is a current value for the vehicle states $[x_1\ x_2\ T_u]^T$ at a current timestep k, $u_k$ is the current pinion angle $\theta_p$, $\xi_k$ is an algorithm noise, as described below, $y_k$ is the measured torque applied by the steering motor 215, $v_k$ is a noise value from the sensors 110 determined as an average scatter of data 115 collection of the sensors 110, A is the 3×3 matrix of Equation 1, B is the 3×1 matrix multiplied to $\theta_p$ in equation 1, C is the 1×3 matrix of Equation 2, D is the factor $-k_{\mathit{eff}}$ in Equation 2, and G is a predetermined noise effectiveness matrix, as described below, for the algorithm noise $\xi_k$. The timestep between two steps k, k+1 can be, e.g., 4 milliseconds. In this context, the symbol k without a subscript is an index referring to a specific timestep and the symbols $k_c, k_p, k_{\mathit{eff}}$ with subscripts refer to stiffness coefficients of components 120 of the steering assembly 200 as described above. The T superscript refers to the matrix transposition function, as is known, that transposes rows of a matrix to columns and columns of a matrix to rows.

To estimate the vehicle states $x_{k+1}$ (and thus the user-applied steering wheel torque $T_u$), the computer 105 can input the current values $x_k$, $y_k$ into a Kalman filter to propagate the states to the k+1 timestep. The Kalman filter predicts the vehicle states at the k+1 timestep by determining an expected value of the vehicle states $\hat{x}_k$ that is determined as a conditional mean of measurements of x up to the k timestep:

$$\hat{x}_k = E[x_k | y_i, i \in [0,k]] \quad (6)$$

where E is the conventional expected value function that outputs an expected value $\hat{x}_k$ for inputs of the vehicle states $x_k$ provided the values for the states y from the timesteps 0 to k. That is, the expected value $\hat{x}_k$ is the probability-weighted sums of the vehicle states $x_k$ provided states $y \in [y_0, y_k]$. To estimate the states $x_k$, based on the predicted states $\hat{x}_k$, the computer 105 can determine an estimation error covariance $P_{k|k}$, a process noise covariance $Q_k$, and a measurement noise covariance $R_k$:

$$P_{k|k} = E[(x_k - \hat{x}_k)(x_k - \hat{x}_k)^T] \quad (7)$$

$$Q_k = \mathrm{cov}(\xi_k, \xi_k) \quad (8)$$

$$R_k = \mathrm{cov}(v_k, v_k) \quad (9)$$

where cov is the known covariance function, i.e., the covariance of two variables a, b having average values $\bar{a}$, $\bar{b}$ is $\mathrm{cov}(a,b) = E[(a-\bar{a})(b-\bar{b})] = \sigma_{ab}^2$, where $\sigma_{ab}$ is the standard deviation of a, b.

The states can be initialized according to simulation testing in one or more test vehicles 101. For example, based on open-loop simulations in a test vehicle 101, an initial value for the vehicle states $\hat{x}_0$ can be determined and stored in the data store 106 and/or the server 130. The initial value $\hat{x}_0$ can be determined based on, e.g., free structured estimation of kinematic models compared with empirically tested parameters of steering assemblies 200 operating according to specified steering torques and adjusted to align with the empirically tested parameters. An initial estimation error covariance $P_0 = E[\hat{x}_0, \hat{x}_0^T]$ can be stored in the data store 106 and/or the server 130.

The computer 105 can determine a Kalman gain $K_k$ for the timestep k:

$$K_k = P_{k|k-1} C_k^T [C_k P_{k|k-1} C_k^T + R_k]^{-1} \quad (10)$$

The Kalman gain $K_k$ is an estimation of a change between expected values of the states $\hat{x}$ between two timesteps k−1 and k. That is, the computer 105 uses the Kalman gain $K_k$ to estimate the expected value $\hat{x}_{k+1|k}$ given previous expected values $\hat{x}_{k|k}, \hat{x}_{k-1|k}$, as described below. The computer 105 can, based on the Kalman gain, update the expected value $\hat{x}_{k|k}$:

$$\hat{x}_{k|k} = \hat{x}_{k-1|k} + K_k[y_k - C_k \hat{x}_{k-1|k}] \quad (11)$$

$$P_{k|k} = [I - K_k C_k] P_{k|k-1} \quad (12)$$

where I is the identity matrix. That is, the computer 105 updates the expected value of the states $\hat{x}_{k|k}$ based on the Kalman gain $K_k$ and the measured values of $y_k$, $C_k$.

The computer 105 can estimate the values of the vehicle states at timestep k+1, $\hat{x}_{k-1|k}$:

$$\hat{x}_{k+1|k} = A_k \hat{x}_{k|k} + B_k u_k \quad (13)$$

$$P_{k+1|k} = A_k P_{k|k} A_k^T + G_k Q_k G_k^T \quad (14)$$

As described above, the vehicle states $x_k$ include the estimated steering torque $T_u$ of the user. By estimating the vehicle states $\hat{x}_{k+1|k}$, the computer 105 estimates a steering torque $T_{u,k+1}$ at the timestep k+1.

The computer 105 can determine the process noise covariance $Q_k$ based on an angular speed $\dot{\theta}_{sw}$ of the steering wheel. That is, the algorithm noise $\xi_k$ can be difficult to directly calculate, and the process noise covariance $Q_k$ can be tuned to simulate the distribution of the algorithm noise. The process noise covariance $Q_k$ can be defined as a 3×3 diagonal matrix:

$$Q_k = \begin{bmatrix} Q_{1,k} & 0 & 0 \\ 0 & Q_{2,k} & 0 \\ 0 & 0 & Q_{3,k} \end{bmatrix} \quad (15)$$

where $Q_1$, $Q_2$, $Q_3$ represent different noise factors. The noise factor $Q_1$ can be determined as the modeling error for the pinion angle $\theta_p$, and can be a constant dimensionless value, e.g., $10^{-3}$.

The noise factor $Q_2$ can be a factor that accounts for noise generated by changes to the speed of the steering wheel:

$$Q_{2,k} = a_{21}\hat{\dot{\theta}}_{sw,k} + a_{22} \quad (16)$$

where $a_{21}$, $a_{22}$ are coefficients determined from a least squares fit of open-loop errors in collected data 115 about the steering wheel angular speed $\dot{\theta}_{sw}$ and $\hat{\dot{\theta}}_{sw,k}$ is an expected value of the steering wheel angular speed $\hat{\theta}_{sw}$ at the timestep k, i.e., $\hat{\dot{\theta}}_{sw,k} = E[\dot{\theta}_{sw,k}|\overline{\theta}_{sw,i}, i \in [0,k]]$.

The noise factor $Q_3$ can be a factor that accounts for high frequency surface noise that causes changes to the steering wheel angular speed $\dot{\theta}_{sw}$ without user intervention. The noise factor $Q_3$ can reduce false positive detection by increasing inversely proportional to the steering wheel angular speed $\dot{\theta}_{sw}$:

$$Q_{3,k} = \frac{a_{31}}{\hat{\dot{\theta}}_{sw,k}} + a_{32} \quad (17)$$

where $a_{31}$, $a_{32}$ are coefficients determine through empirical testing on road surfaces with differing roughness to determine surface noises that can affect algorithm noise.

The measurement noise covariance $R_k$ can be a predetermined value based on a resolution of the sensors 110 used to measure the pinion angle $\theta_p$ and the column torque $T_m$. For example, the measurement noise covariance $R_k$ can be, e.g., $10^{-5}$. The ratio of the noise covariances $$\frac{Q_k}{R_k}$$

describes the apportionment of errors between the algorithm noise and the sensor 110 resolution. For example, if $$\frac{Q_k}{R_k} \gg 1,$$

the errors from the algorithm noise outweigh the errors from the sensor 110 resolution.

The algorithm noise $\xi_k$ is an error term that adjusts the vehicle states $x_{k+1}$ according to errors in the state-estimation algorithm. That is, outputs from the Kalman filter can differ from measured results, as described with respect to the algorithm noise covariance $Q_k$ above. The matrix $G_k$ for the algorithm noise $\xi_k$ can be a predetermined constant matrix that weights the algorithm noise $\xi_k$. That is, the matrix $G_k$ can be determined to tune the algorithm noise $\xi_k$ to account for simplifications of physical models used in the steering models that defined the $A_k$, $B_k$ matrices. That is, the values in $G_k$ can be determined based on empirical testing to compensate for differences between virtual steering models and actual steering operation.

The computer 105 can compare the estimated user-applied steering wheel torque $T_{u,k+1}$ at the timestep k+1 to a torque threshold. The torque threshold can be determined as an average torque applied by users as determined from empirical testing to turn the vehicle 101, i.e., a torque applied to the steering wheel 205 to transition the vehicle 101 from autonomous control of the steering assembly 200 to manual control. That is, the user may inadvertently bump the steering wheel 205, generating a torque on the steering wheel 205 without intending to transition out of the autonomous mode; inadvertently applied torque should not be interpreted as an input to initiate a mode transition. The torque threshold can be determined as higher than inadvertent torques to avoid false positive indications to transition out of the autonomous mode.

The computer 105 can determine whether the estimated user-applied steering wheel torque $T_{u,k+1}$ exceeds the torque threshold for an elapsed time exceeding a time threshold. The time threshold can be determined by empirical testing as a time greater than an inadvertent bump on the steering wheel 205 and less than a typical time for the user to apply torque to request to transition out of the autonomous mode. That is, the time threshold can be determined to reduce false positive indications from inadvertent bumps from the user while recognizing intent by the user to transition from autonomous control of the steering assembly 200 to manual control.

Upon determining to transition from autonomous control of the steering assembly 200 to manual control, the computer 105 can transition to one of the semiautonomous mode or the manual mode. The computer 105 can include a mode manager, i.e., programming that determines the specific mode to transition upon leaving the autonomous mode or the semiautonomous mode. For example, the mode manager can include programming to transition the vehicle 101 from the autonomous mode to the semiautonomous mode upon receiving user input to the steering wheel 205, allowing user input to the steering wheel 205 and maintaining computer 105 control of the propulsion and/or the braking. In another example, the mode manager can include programming to transition the vehicle 101 to the manual mode, allowing the user to control the steering, the propulsion, and the braking.

Figure 4:
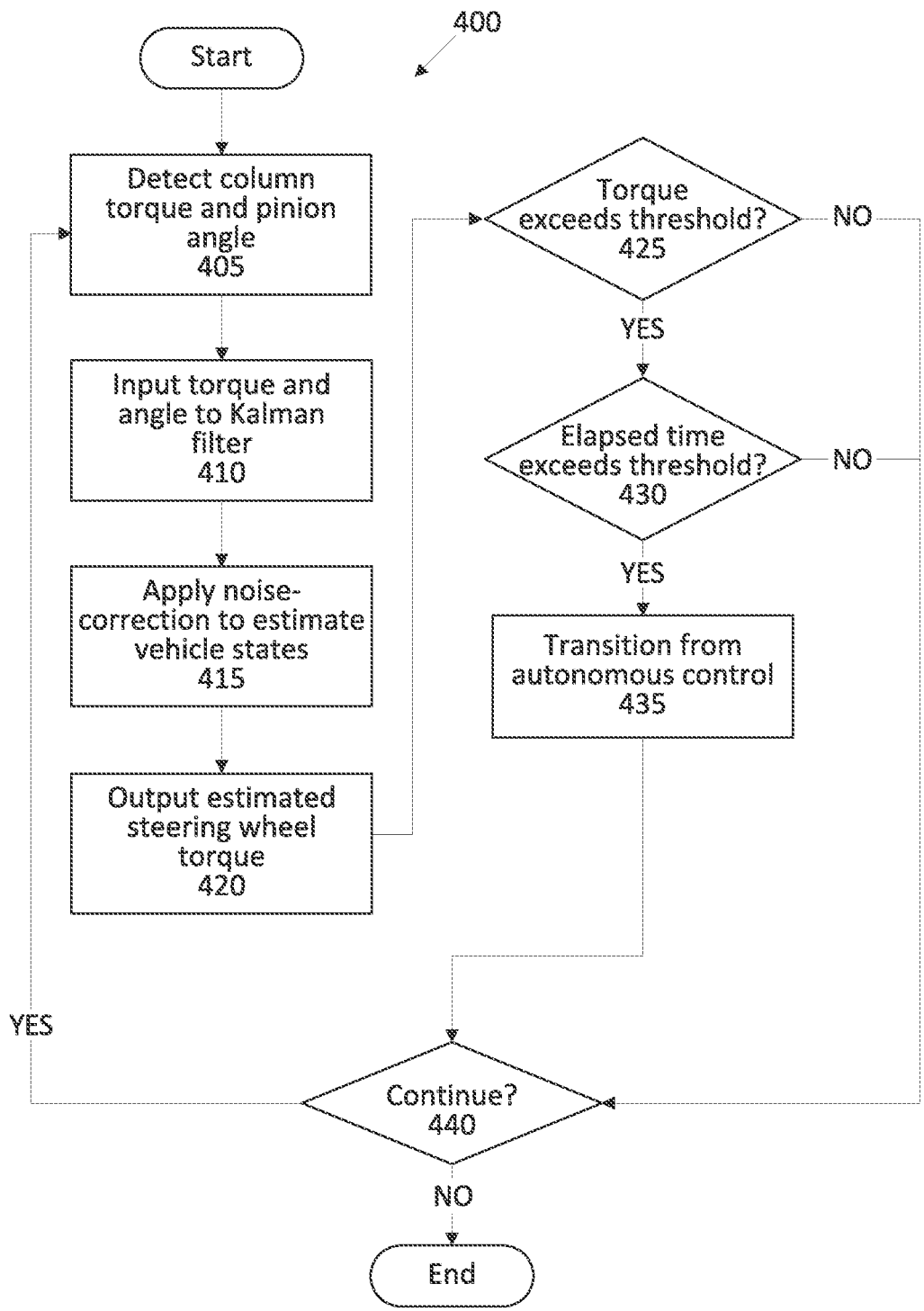
FIG. 4 is a block diagram of an example process for operating the vehicle.

FIG. 4 is a block diagram of an example process 400 for vehicle operation. The process 400 begins in a block 405, in which the computer 105 detects a steering column torque $T_m$ and a steering pinion angle $\theta_p$. As described above, the computer 105 can actuate one or more sensors 110 to detect the current steering column torque $T_m$ and the current steering pinion angle $\theta_p$.

Next, in a block 410, the computer 105 inputs the detected steering column torque $T_m$, the pinion angle $\theta_p$, and parameters describing a steering assembly 200 to a Kalman filter. As described above, the Kalman filter is a state-estimation algorithm that estimates a plurality of vehicle states $x_1$, $x_2$, $T_u$ based on the input values, an algorithm noise, and a gain factor that accounts for changes in expected values of the states.

Next, in a block 415, the computer 105 applies noise correction to estimate the vehicle states $x_1$, $x_2$, $T_u$. As described above, the computer 105 predicts values for the vehicle states $x_1$, $x_2$, $T_u$ and then applies noise factors $\xi$, $\nu$ that result from algorithm noise and resolution noise to correct the predicted vehicle states $x_1$, $x_2$, $T_u$ to output estimated vehicle states $x_1$, $x_2$, $T_u$.

Next, in a block 420, the computer 105 outputs an estimated user-applied steering wheel torque $T_u$. As described above, the state-estimation algorithm can output predicted vehicle states $x_1$, $x_2$, $T_u$ that include an estimation of a user-applied steering wheel torque $T_u$ applied to the steering wheel 205 from a user. The state-estimation algorithm outputs an estimation for the user-applied steering wheel torque $T_u$ at a time indicated by a timestep k+1, where the timestep k corresponds to the current time.

Next, in a block 425, the computer 105 determines whether the estimated user-applied steering wheel torque exceeds a torque threshold. The torque threshold is a torque that indicates that the user intends to transition the vehicle 101 from the autonomous mode to the semiautonomous mode or the manual mode. If the estimated user-applied steering wheel torque exceeds the torque threshold, the process 400 continues in a block 430. Otherwise, the process 400 continues in a block 440.

In the block 430, the computer 105 determines whether the estimated user-applied steering wheel torque exceeds the torque threshold for an elapsed time exceeding a time threshold. The time threshold can be determined to reduce false positive indications from inadvertent bumps from the user while recognizing intent by the user to transition to the semiautonomous mode or the manual mode. If the elapsed time exceeds the time threshold, the process 400 continues in a block 435. Otherwise, the process 400 continues in the block 440.

In the block 435, the computer 105 transitions the vehicle 101 from autonomous control of the steering assembly 200 to manual control. As described above, the computer 105 can include a mode manager, i.e., programming to determine to which of the semiautonomous mode and the manual mode the computer 105 should transition upon receiving input from the user. For example, the computer 105 can transition to the semiautonomous mode, allowing manual input to the steering while operating the propulsion and the braking with the computer 105.

In the block 440, the computer 105 determines whether to continue the process 400. For example, the computer 105 can determine to continue the process if the estimated steering wheel torque $T_u$ indicates that the user does not intend to transition out of the autonomous mode. If the computer 105 determines to continue, the process 400 returns to the block 405. Otherwise, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   detect an actual steering column torque and an actual steering wheel angle;
   predict a user-applied steering wheel torque with a state-estimation algorithm that accepts input including the actual steering column torque and the actual steering wheel angle, and outputs a plurality of vehicle states including the predicted user-applied steering wheel torque;
   adjust the plurality of vehicle states based on an algorithm noise that is based on a steering wheel angular speed to generate estimated vehicle states;
   output the estimated vehicle states including an estimated user-applied steering wheel torque; and
   transition from an autonomous mode to a manual mode when the estimated user-applied steering wheel torque exceeds a threshold.

2. The system of claim 1, wherein the plurality of vehicle states include the steering wheel torque, an estimated steering wheel angle, and an estimated steering wheel angle speed.

3. The system of claim 2, wherein the estimated steering wheel angle speed includes a time rate of change of the steering wheel angle and a steering wheel inertia generated by the actual steering wheel torque turning a steering wheel to the actual steering wheel angle.

4. The system of claim 1, wherein the instructions further include instructions to transition from the autonomous mode to the manual mode when the estimated user-applied steering wheel torque exceeds the threshold for an elapsed time exceeding a time threshold.

5. The system of claim 1, wherein the instructions further include instructions to input the actual steering column torque, the actual steering wheel angle, a stiffness of a steering column, and a damping coefficient of the steering wheel to the state-estimation algorithm to estimate the user-applied steering wheel torque.

6. The system of claim 1, wherein the algorithm noise is a covariance of a modeling error, the steering wheel angular speed, and a noise factor that is inversely proportional to the steering wheel angular speed.

7. The system of claim 1, wherein the instructions further include instructions to initiate the state-estimation algorithm with a set of predetermined parameters including a reference steering motor torque and a reference steering wheel angle.

8. The system of claim 1, wherein the state-estimation algorithm is a Kalman filter.

9. The system of claim 1, wherein the estimated user-applied steering wheel torque is a torque applied to a steering wheel by an operator of a vehicle.

10. The system of claim 1, wherein the instructions further include instructions to input a damping coefficient of a steering column and a damping coefficient of a steering wheel to the state-estimation algorithm to estimate the user-applied steering wheel torque.

11. A method, comprising:
detecting an actual steering column torque and an actual steering wheel angle;
predicting a user-applied steering wheel torque with a state-estimation algorithm that accepts input including the actual steering column torque and the actual steering wheel angle, and outputs a plurality of vehicle states including the predicted user-applied steering wheel torque;
adjusting the plurality of vehicle states based on an algorithm noise that is based on a steering wheel angular speed to generate estimated vehicle states;
outputting the estimated vehicle states including an estimated user-applied steering wheel torque; and
transitioning from an autonomous mode to a manual mode when the estimated user-applied steering wheel torque exceeds a threshold.

12. The method of claim 11, wherein the plurality of vehicle states include the steering wheel torque, an estimated steering wheel angle, and an estimated steering wheel angle speed.

13. The method of claim 12, wherein the estimated steering wheel angle speed includes a time rate of change of the steering wheel angle and a steering wheel inertia generated by the actual steering wheel torque turning a steering wheel to the actual steering wheel angle.

14. The method of claim 11, further comprising transitioning from the autonomous mode to the manual mode when the estimated user-applied steering wheel torque exceeds the threshold for an elapsed time exceeding a time threshold.

15. The method of claim 11, wherein the estimated user-applied steering wheel torque is a torque applied to a steering wheel by an operator of a vehicle.

16. A system, comprising:
a steering wheel;
a steering column connected to the steering wheel;
means for detecting an actual steering column torque and an actual steering wheel angle of the steering wheel;
means for predicting a user-applied steering wheel torque with a state-estimation algorithm that accepts input including the actual steering column torque and the actual steering wheel angle, and outputs a plurality of vehicle states including the predicted user-applied steering wheel torque;
means for adjusting the plurality of vehicle states based on an algorithm noise that is based on a steering wheel angular speed to generate estimated vehicle states;
means for outputting the estimated vehicle states including an estimated user-applied steering wheel torque; and
means for transitioning from an autonomous mode to a manual mode when the estimated user-applied steering wheel torque exceeds a threshold.

17. The system of claim 16, wherein the plurality of vehicle states include the steering wheel torque, an estimated steering wheel angle, and an estimated steering wheel angle speed.

18. The system of claim 17, wherein the estimated steering wheel angle speed includes a time rate of change of the steering wheel angle and a steering wheel inertia generated by the actual steering wheel torque turning a steering wheel to the actual steering wheel angle.

19. The system of claim 16, further comprising means for transitioning from the autonomous mode to the manual mode when the estimated user-applied steering wheel torque exceeds the threshold for an elapsed time exceeding a time threshold.

20. The system of claim 16, wherein the estimated user-applied steering wheel torque is a torque applied to the steering wheel by an operator of a vehicle.

* * * * *